US008775792B2

(12) United States Patent
Davies, Sr. et al.

(10) Patent No.: US 8,775,792 B2
(45) Date of Patent: Jul. 8, 2014

(54) METHOD OF AND SYSTEM FOR ENCRYPTION AND AUTHENTICATION

(75) Inventors: Traverse A. Davies, Sr., Halifax (CA); Jordan Bruce MacLeod, Charlottetown (CA)

(73) Assignee: Strue, Inc. (CA)

( * ) Notice: Subject to any disclaimer, the term of this patent is extended or adjusted under 35 U.S.C. 154(b) by 845 days.

(21) Appl. No.: 11/917,136

(22) PCT Filed: Jun. 9, 2006

(86) PCT No.: PCT/CA2006/000958
§ 371 (c)(1),
(2), (4) Date: Mar. 21, 2008

(87) PCT Pub. No.: WO2006/130991
PCT Pub. Date: Dec. 14, 2006

(65) Prior Publication Data
US 2009/0034725 A1   Feb. 5, 2009

(51) Int. Cl.
*H04L 29/06* (2006.01)
*H04L 9/32* (2006.01)

(52) U.S. Cl.
CPC ............. *H04L 9/3215* (2013.01); *H04L 63/18* (2013.01)
USPC ...................................................... 713/153

(58) Field of Classification Search
CPC ................... H04L 9/3215; H04L 63/18
USPC .......................... 709/238; 713/153
See application file for complete search history.

(56) References Cited

U.S. PATENT DOCUMENTS

| 4,100,374 A | 7/1978 | Jayant et al. |
| 4,802,220 A | 1/1989 | Marker |
| 6,477,578 B1 * | 11/2002 | Mhoon ............... 709/229 |
| 6,791,940 B1 * | 9/2004 | Rajesh ................ 370/219 |
| 7,171,493 B2 * | 1/2007 | Shu et al. ............ 709/246 |
| 7,209,560 B1 * | 4/2007 | Fairman et al. ....... 380/255 |
| 7,581,113 B2 * | 8/2009 | Smith et al. .......... 713/184 |

(Continued)

FOREIGN PATENT DOCUMENTS

WO   WO 99/10859   4/1999

OTHER PUBLICATIONS

W. Richard Stevens. TCP/IP Illustrated: the Protocols. 1994. vol. 1. p. 239-241.*

(Continued)

*Primary Examiner* — Bradley Holder
(74) *Attorney, Agent, or Firm* — Foley & Lardner LLP

(57) ABSTRACT

The invention provides a method of and system for networked security, involving multiple clients and servers. Rather than relying on single server based authentication and/or single stream based data transmission, the invention breaks apart information before if leaves the User's computer so that intercepting any single electronic message does not provide the hacker with sufficient information to gain access. The invention splits the values (i.e. password, User name, card number for authorization; encrypted text for encryption, etc.) at the point of sender/external authorization client. These split values are encrypted with different keys and transmitted to multiple external authorization servers. The invention can be applied to any secure transmission, storage or authentication of data over a data network.

19 Claims, 9 Drawing Sheets

(56) References Cited

U.S. PATENT DOCUMENTS

| | | | |
|---|---|---|---|
| 2001/0044905 A1* | 11/2001 | Novak et al. | 713/201 |
| 2003/0115364 A1* | 6/2003 | Shu et al. | 709/246 |
| 2003/0208693 A1* | 11/2003 | Yoshida | 713/201 |
| 2004/0003265 A1* | 1/2004 | Freeman et al. | 713/191 |
| 2004/0030921 A1* | 2/2004 | Aldridge et al. | 713/200 |
| 2006/0177061 A1* | 8/2006 | Orsini et al. | 380/268 |

OTHER PUBLICATIONS

Diffe et al.; New directions in cryptography; Information Theory, IEEE Transactions on (vol. 22, Issue: 6); Nov. 1976; pp. 644-654.*

Popek et al.; Encryption and Secure Computer Networks; Journal ACM Computing Surveys (CSUR) Surveys Homepage archive vol. 11 Issue 4, Dec. 1979 pp. 331-356.*

International Search Report dated Oct. 18, 2006.

* cited by examiner

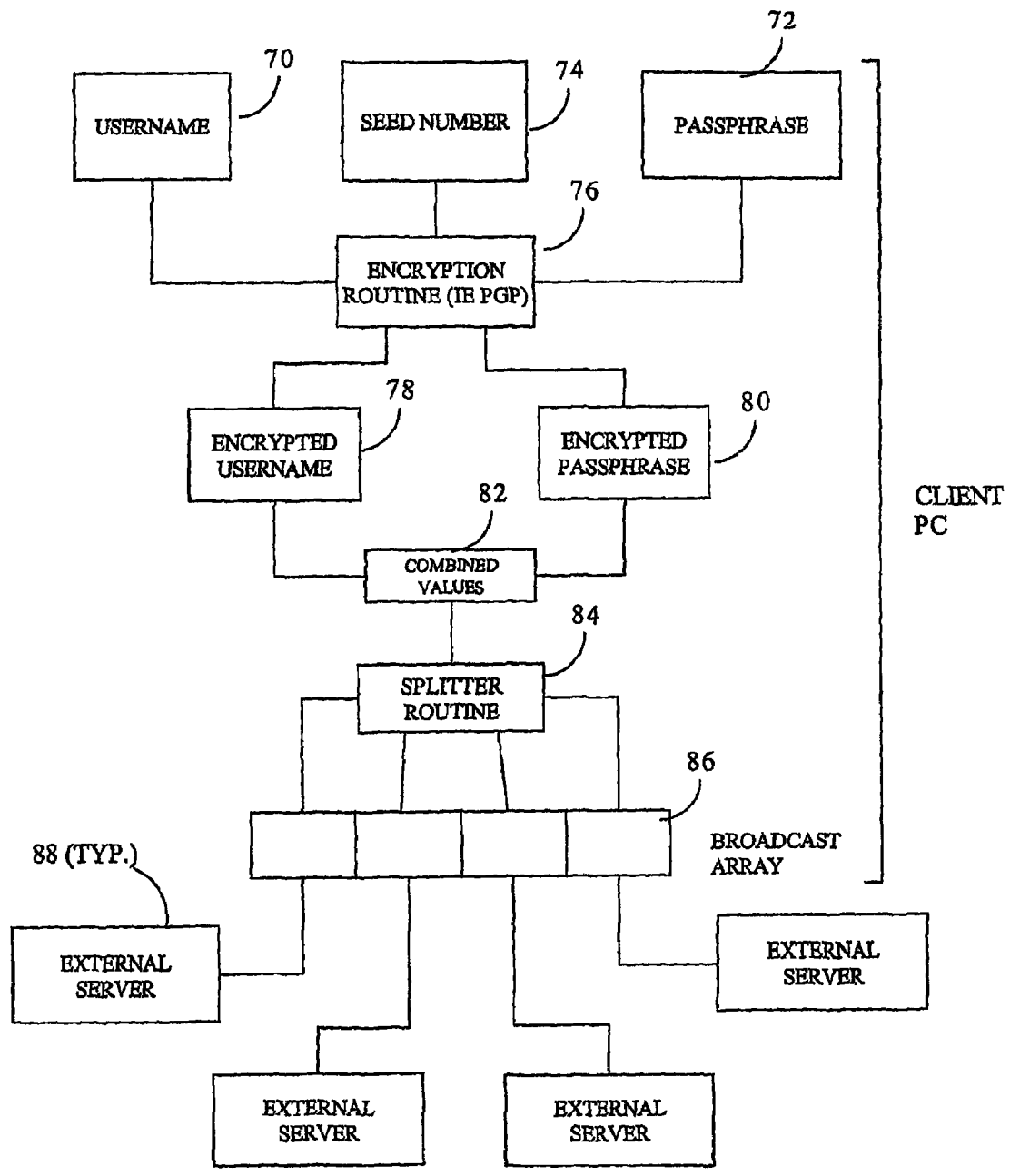
BROADCAST POINTS       FIGURE 4A

METHOD OF AND SYSTEM FOR ENCRYPTION AND AUTHENTICATION

FIELD OF INVENTION

The present invention relates generally to telecommunications, and more specifically, to a method of and system for electronic encryption, authentication and security over networked systems.

BACKGROUND OF THE INVENTION

Computer and telecommunications systems are almost pervasive in the industrialized world today. Many of these systems provide access to personal and/or commercial data, services and resources that must be kept secure, limiting access to those individuals and devices with proper authorization. This is a major challenge. Unauthorized access is known to occur on a regular basis to some of the most heavily guarded computer systems and local networks on the planet, including for example, servers in the Pentagon.

Almost all existing authorization processes employ a model wherein Users communicate their access information in the form of single electronic messages to single servers. An exemplary block diagram of such a system is shown in FIG. 1.

In the course of the login process, a prospective User 12 will send a single electronic message containing, for example, a User ID (identification) and password. This single electronic message is received by the single server 14 over the network 16 (which may be a local Ethernet, wide area network, telecommunications network, Internet; wireless, hard wired or fiber optic network; or any combination of these or similar networks) and it determines whether the submitted data correlates with a stored, authorized User ID and hashed password 18. If the User ID and password are valid then access to the secure resources 20 is allowed, while if the information is invalid, access is denied.

This existing authorization process is highly and increasingly vulnerable to hacking (i.e. unauthorized entry) into servers that often carry private, valuable and confidential information. The above process is highly vulnerable because a hacker 22 (i.e. an individual or computer attempting to obtain unauthorized entry) is often able to intercept the single electronic message containing the User's ID and password, and thereby obtain all necessary information to gain access. Hackers are also able to trick single servers into believing they are an authorized User by exploiting known weaknesses or gaining back door entry.

Either way, the use of a single electronic message to a single server has been found to be an insecure method of authentication and security.

A similar paradigm is used for encryption, where a single key or phrase is used to protect a document or dataset. Again, this is an ineffective method of protection. Keys and phrases that are too short are easily discovered simply by guesswork. Keys that are long are generally stored electronically, and thus are vulnerable to being found or intercepted. Accordingly, the use of a single key or phrase stored in a single location has also been found to be an ineffective model for encryption.

There is therefore a need for a method of and system for electronic encryption, authentication and security over networked systems, which addresses the problems outlined above.

SUMMARY OF THE INVENTION

It is therefore an object of the invention to provide a method of and system for electronic encryption, authentication and security over networked systems, which obviates or mitigates at least one of the disadvantages described above.

An authorization and encryption process has been developed that may be described as Multi-Homed Protection (MHP). MHP splits data values being protected (for example a password, User name, card number for authorization, encrypted text for encryption, or other data) at the point of the sender or external authorization client 30, as shown in the process flow diagram of FIG. 2.

For authorization processes, these split values are encrypted with different keys and transmitted to multiple external authorization servers 32, 34 (two are shown, but many more could be used). These external authorization servers 32, 34 verify the username, password, etc. at different servers by comparing submitted data with stored tables. Each external authorization server 32, 34 then provides an authorization ID to the protected authorization server 36. The total of all multiple authorization IDs are required to match. Provided all IDs match, a validation key is then returned to each of the issuing external authorization servers, thus signifying valid authorization.

This technology introduces and provides an exponential increase in complexity and security for systemic authorization processes. Because of the difficulty in intercepting every partial set of values simultaneously, it carries the potential to minimize occurrences of hacking to the point where almost all hacking that occurs is due to human error (for example, the Client leaving his password written down at his desk, or falling victim to a "shoulder-surfing" attack by a co-worker).

Similar to the authorization process, the multi-homed encryption (MHE) process splits encrypted values at the point of sending, transmitting each encrypted part to different external servers. These parts are then relayed to the recipient, where the whole set of encrypted values is consequently reassembled.

This technology makes it virtually impossible to intercept the entire set of transmitted encrypted values/text. Because of the difficulty in intercepting every partial set of values simultaneously, this technology results in an exponential improvement in the degree of protection for the encryption process.

One aspect of the invention is defined as a method of secured communication over a networked system comprising the steps of: a first party: splitting a secure message into two or more separate messages, each separate message including at least some unique portion of the secure data message, and all of the two or more separate messages collectively preserving all of the information contained in the secure message; and transmitting each of the two or more separate messages to a separate gatekeeper. Each of the separate gatekeepers then receive a respective one of the separate messages; securely process the separate message, and transmit the processed separate message to a second party. The second party receives the processed separate messages from each of the separate gatekeepers; and re-assembles the processed, separate messages.

Another aspect of the invention is defined as a system for secured communication comprising: a first device operable to: split a secure message into two or more separate messages, each separate message including at least some unique portion of the secure data message, and all of the two or more separate messages collectively preserving all of the information contained in the secure message; and transmit each of the two or more separate messages to a separate gatekeeper; each of the separate gatekeepers being operable to: receive a respective one of the separate messages; securely process the separate message, and transmit the processed separate message to a second device; the second device being operable to: receive the processed separate messages from each of the separate gatekeepers; and re-assemble the processed, separate messages; the first device, second device and separate gatekeepers being interconnected via a communication network.

This summary of the invention does not necessarily describe all features of the invention.

BRIEF DESCRIPTION OF THE DRAWINGS

These and other features of the invention will become more apparent from the following description in which reference is made to the appended drawings wherein:

FIGS. 4A-4D present a set of process flow diagrams of an authentication model in an embodiment of the invention.

DETAILED DESCRIPTION

Figure 1:
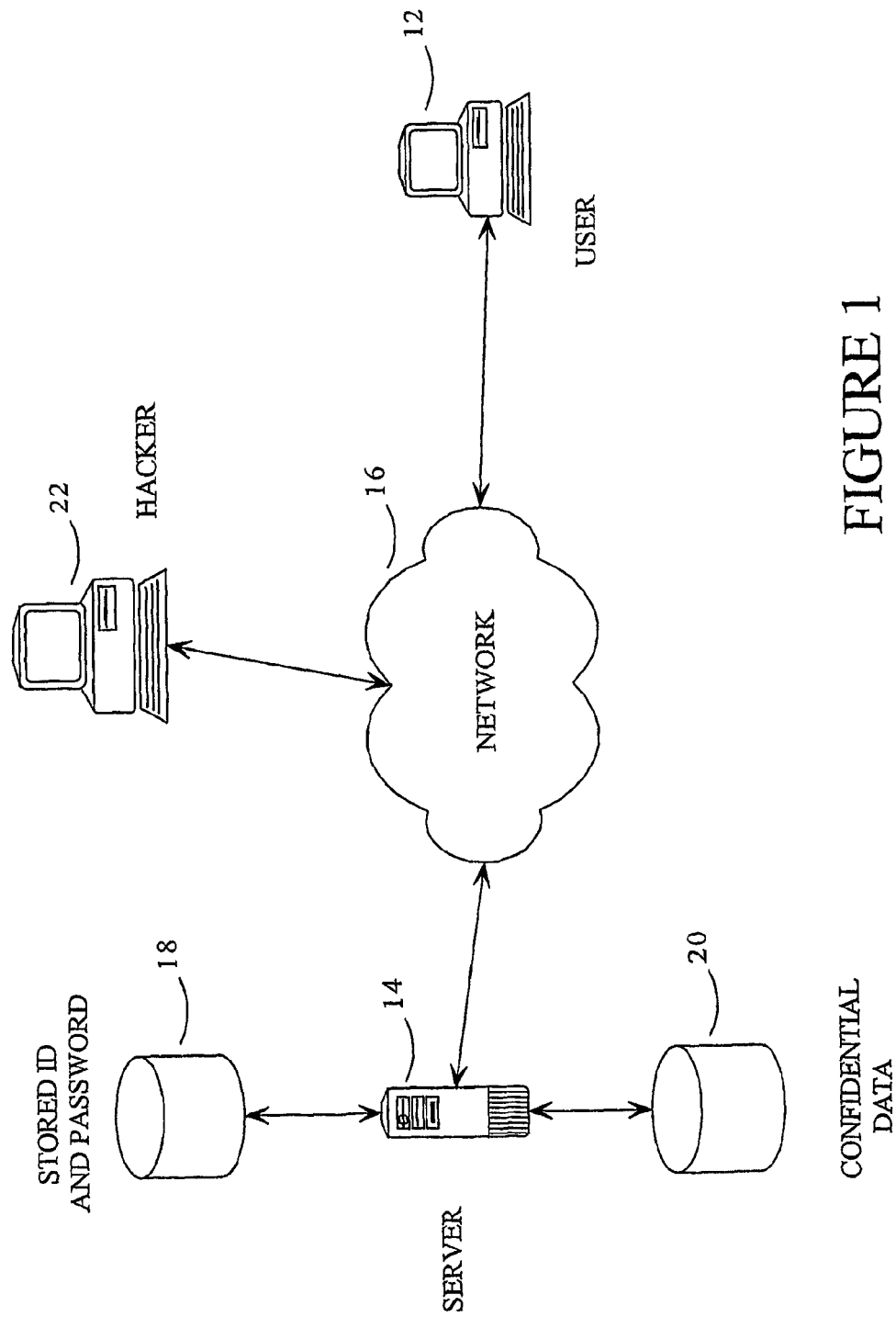
FIG. 1 presents a system block diagram of a basic authentication model as known in the art.
Figure 2:
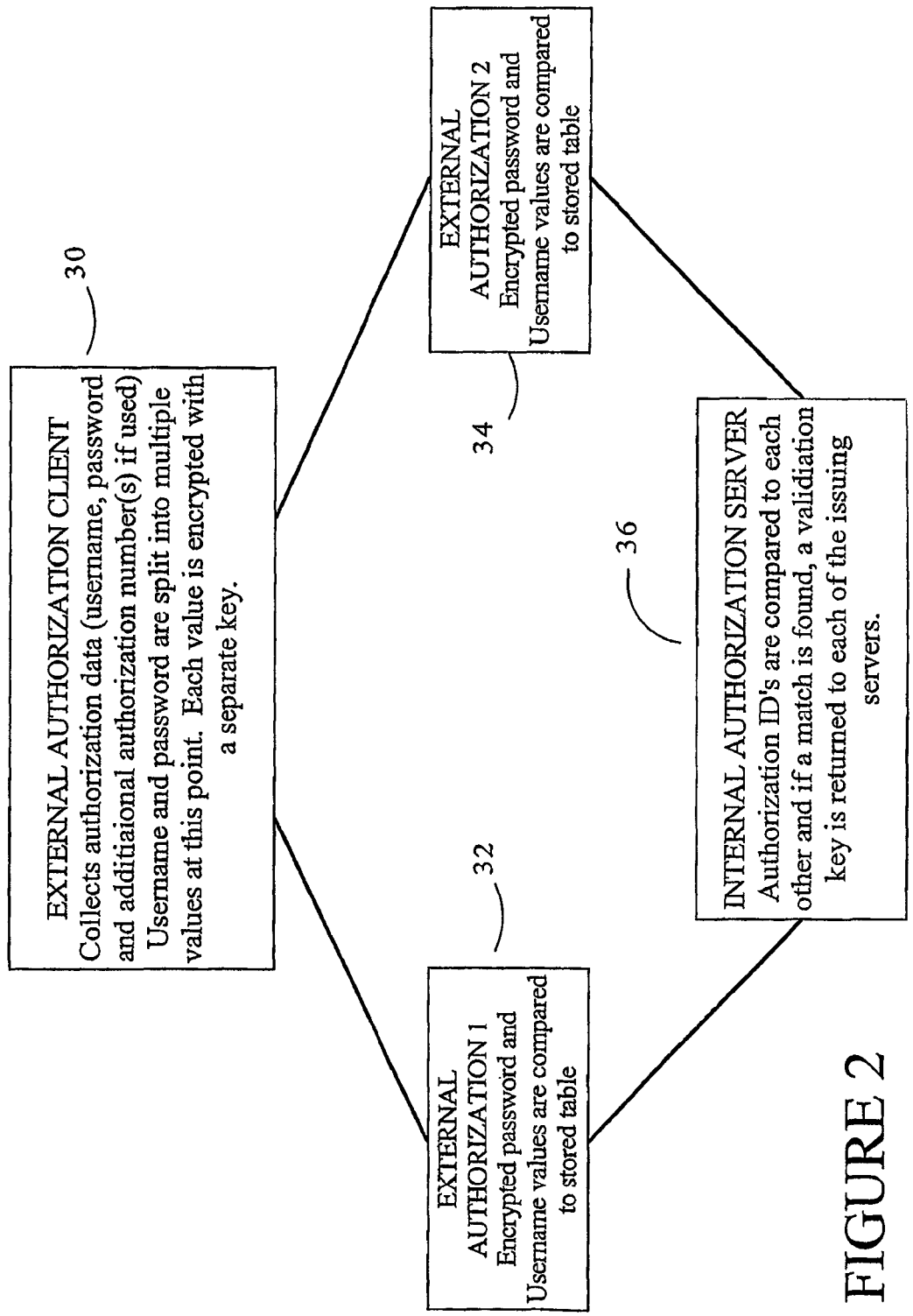
FIG. 2 presents a process flow diagram of an authentication model in an embodiment of the invention.

A method of and system for electronic encryption, authentication and security over networked systems is described, that is far more secure from known hacking techniques than existing security processes. While existing security processes typically rely on one single electronic message and one server, the process of the invention breaks information apart before it leaves the User's computer or other digital device, so that intercepting any single electronic message does not provide the hacker with sufficient information to gain access. It will send, for example, the User identification (ID) and password to two or more external servers that act as gatekeepers. The system and method of the invention can break apart this information several times, each time providing an exponential increase in security.

The system and method of the invention can be implemented over any form of network, including, for example, a local Ethernet, wide area network, telecommunication network, Internet; wireless, hard wired or fiber optic network; or any combination of these or similar networks. As well, the User or client may be any electronic device capable of supporting simple computation, including for example a personal computer (PC), laptop computer, personal digital assistant (PDA), wireless email device, cellular telephone, or MP3 player. Other similar devices could also be used. Of course, the system can accommodate access to any data or content including, for example: music, video, web pages and email.

Each server, or gatekeeper, then communicates independently with the protected server that holds the information or resources that are being secured. For each gatekeeper, there is a key where preexisting data (User ID, password, etc) must correspond to the submitted data. Ultimately, each key must grant authorization before the User gains access to the protected server. This process makes it exponentially more difficult for hackers to penetrate into protected servers than any existing form of authorization security.

This method and system is straightforward to implement given the teachings herein and is able to piggyback off existing software programs. The ability to decentralize information introduces an entirely new paradigm into the IT security world (from centralized, Newtonian communication, to decentralized, fractal communication) and gives it tremendous value, particularly in the global business, scientific and defense communities where the level of authorization security is currently inadequate.

The encryption process of the invention functions under the same principles as the authorization process. Basically, existing encryption technology, such as PGP—the world's leader in encryption software—wraps a single message into a complex encrypted message. A potential interceptor or hacker may be easily able to intercept the message. Though it is extremely difficult to decrypt the message without knowing the key, it is not impossible—given enough time and processing power, it can be decrypted. The invention is able to piggyback on PGP or almost any other encryption software, and the combination of the two would offer an exponentially greater level of encryption security.

The encryption process works by fragmenting a message into two or more—and potentially thousands or millions—of parts and sending the parts to the recipient via several different communication channels. Thus, if a hacker is able to intercept one message he or she will only have obtained a small part of the whole message. The more parts that the message is broken into, the more difficult it becomes for the hacker to intercept each crucial, partial message. Even if a hacker were able to intercept every one of several thousand messages—some of which could be decoys—the hacker would then have the enormous difficulty of putting these pieces back together. Furthermore, each of these messages will be encrypted using a high level of existing encryption software, such as PGP which is currently one of the strongest.

The invention is not unbreakable—no encryption technology is—however, it does provide an exponential increase in protection from existing technology.

The present invention will be further illustrated by means of the following examples.

FIGS. 3A-3C

Figure 3A:
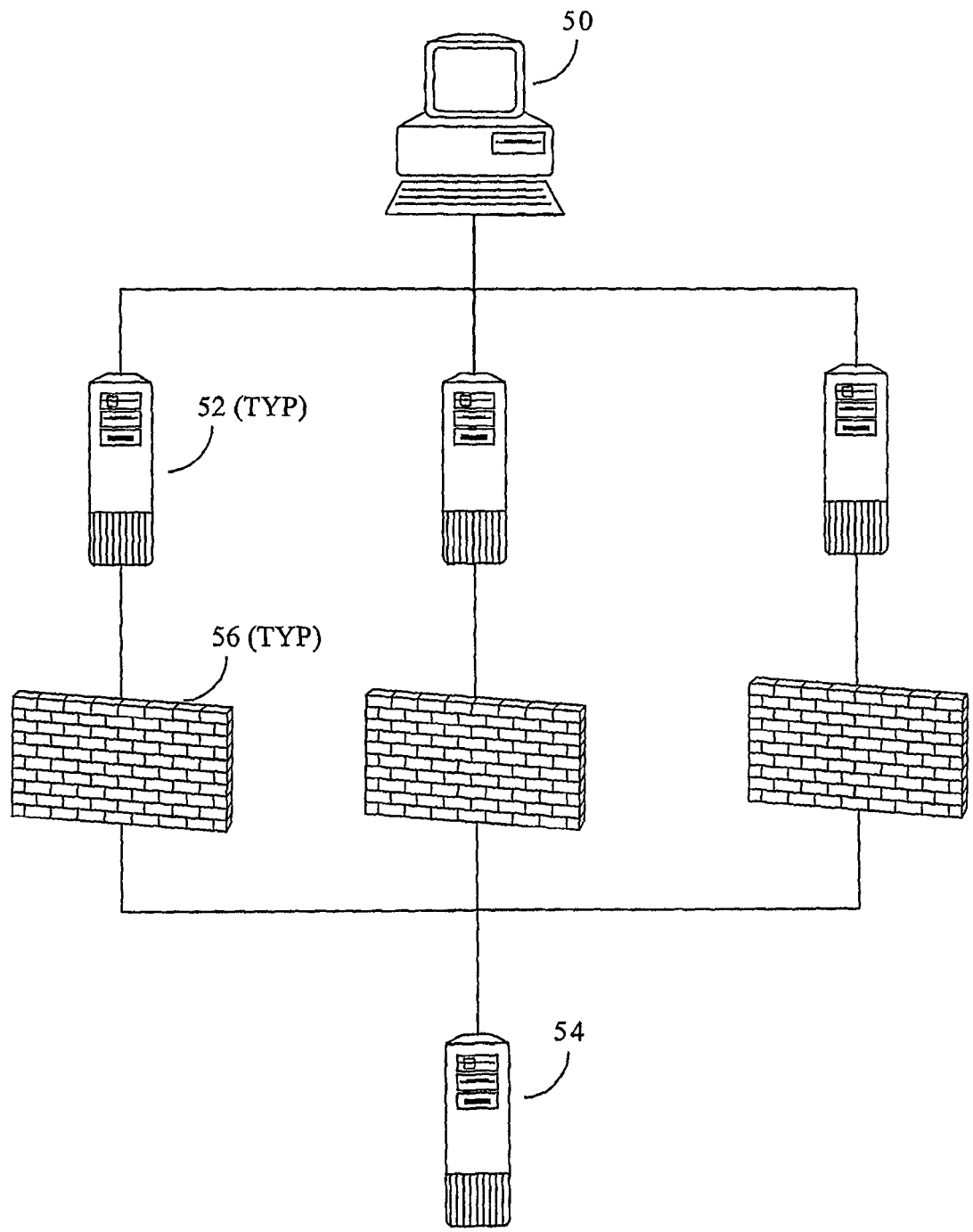
FIGS. 3A-3C present a set of system block diagrams for authentication, document transmission and document storage paradigms respectively, in embodiments of the invention.
Figure 3B:
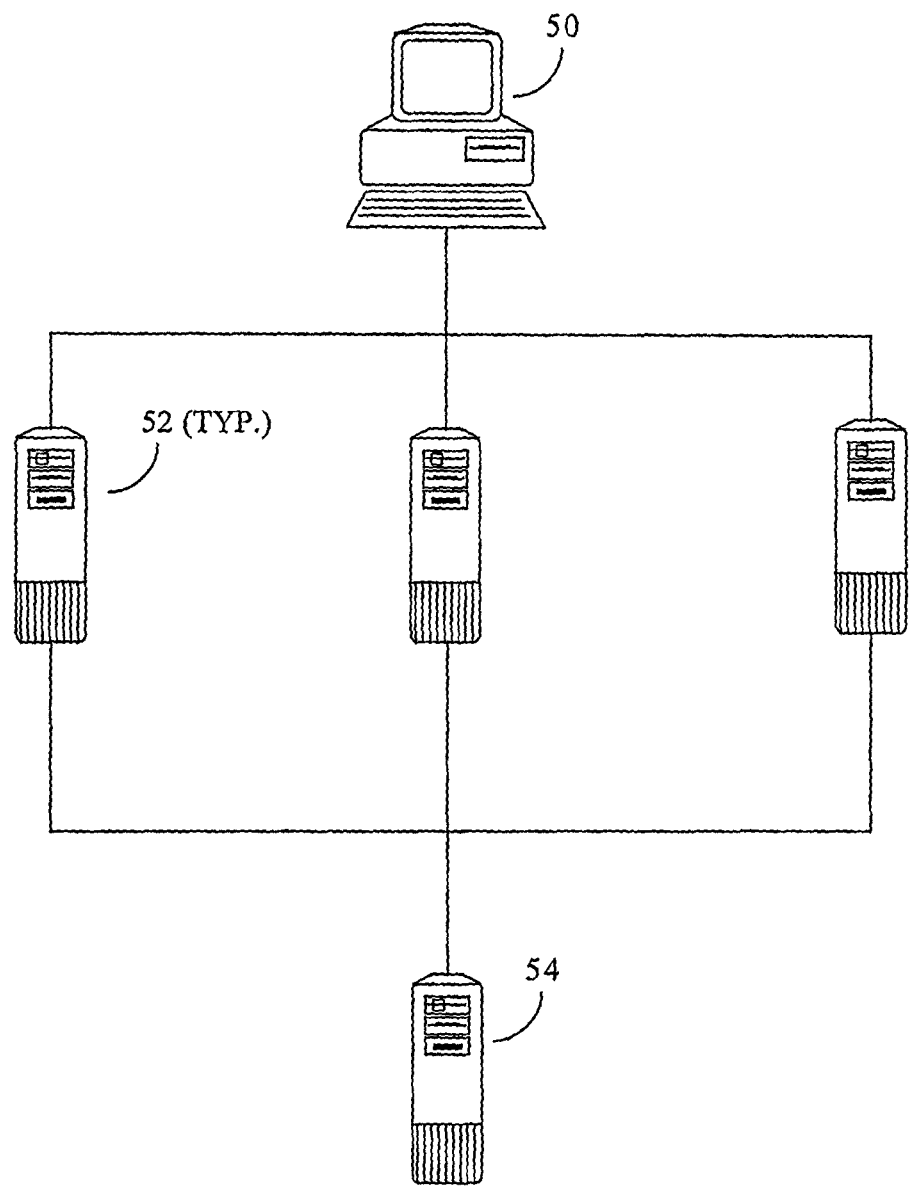
Figure 3C:
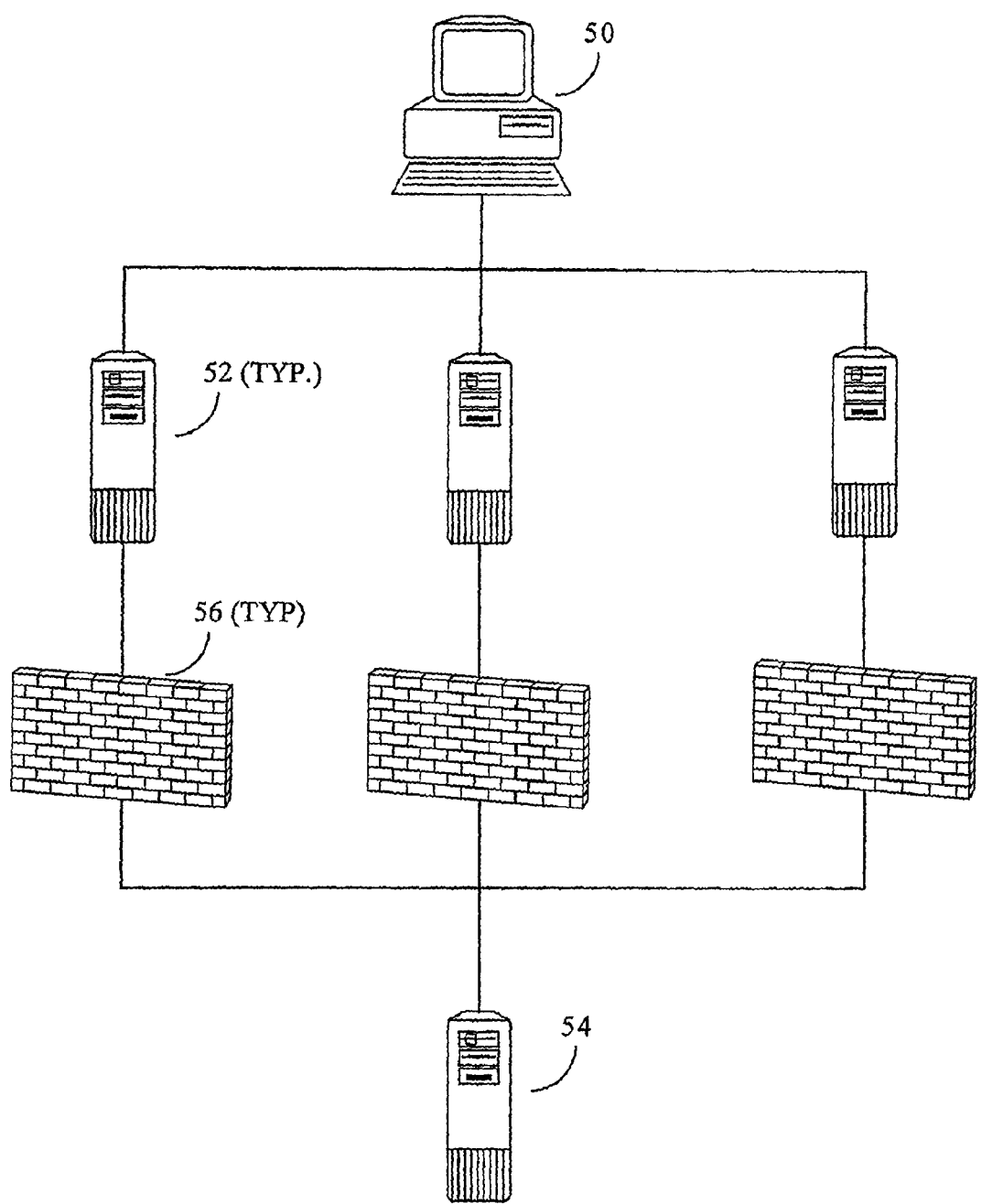

FIGS. 3A-3C present system block diagrams of authentication, document transmission and document storage paradigms respectively.

In one embodiment of the invention a message (either encrypted or plaintext) is broken into multiple parts on the User's computer 50 using a partitioning algorithm, which may be a sliding or a non-sliding algorithm. Note that the partitions of data can overlap one another, provided that collectively, they preserve all of the information from the original message. Each of these multiple parts gets transmitted independently to a separate external server 52, and each of those external servers 52 authenticates its part of the message based on stored algorithms (thus, the external servers 52 are operating as partial authentication servers). This can be done by storing each piece on each external server 52 (for identity authentication) or by running the same algorithms on a stored firewalled version of the whole (i.e. Username and Passphrase). Though three external servers 52 are shown in FIG. 3A, there is no upper limit on the number of external servers 52 that could be employed.

After the pieces have been authenticated, they are sent to a firewalled server 54, 56 that only communicates with the individual authentication servers 52. This firewalled server 54, 56 compares the authentication certificates from each authentication server 52, or in the case of an encrypted message, recombines the pieces. In the case of authentication, all of the certificates are compared and it is determined whether or not all are valid. If they are valid, each authentication server 52 is given a validity certificate from the firewalled server 54, 56, and then sends a final validity to the client (whether that is an e-commerce enabled website, a network login or any other electronic password protection utility).

The order of the pieces to be recombined can be determined in a number of ways. For example:
1. they could be ordered by their original transmission time stamps (i.e. the time at which they left the original User);
2. each separate piece could be given a unique number or other identifier when the splitting is done on the User, the piece numbering being encrypted with the balance of the data in the piece. Numberic identifiers, of course, do not have to be in numerical order;
3. a "rules-based" approach could be used;
4. a schema approach could be used; or
5. any combination of the above. For example, timing data could be mixed with an identifier, which indicates which rule to apply.
Other methods of determining the order of the pieces would be clear to one skilled in the art.

The same could also be done with a non-firewalled server 54 as shown in FIG. 3B.

In the case of document storage per FIG. 3C, the document remains stored on the firewalled server 54, 56 until a request arrives, at which point the document is rebroken by the appropriate algorithms and sent out to the receiving computer 50 using the same multiple server schema (that is, sending separate pieces through multiple external servers 52). In the case of document transmission (i.e. e-mail transmission and the like) per FIG. 3B, the multiple parts are sent to the recipient who checks the validity of each piece and then re-combines and decrypts. Multiple parts could also be stored on multiple servers and never made whole.

The major ways in which this can address issues with existing technologies are as follows:
  in order to duplicate the hash of a password (as noted above in the Background to the Invention) a hacker would need to determine which pieces of the message contain the values they need to alter and then duplicate the hash of each of those parts. This may involve many parts; and
  in the case of packet sniffing, multiple routing means that there are multiple packet ID's comprising the same pieces of data, making reassembly of the original transmission very difficult, as well as making the packet sniffer need to work on multiple machines simultaneously and determine which packets have the same originating sender. Even when this is completed, the hacker still needs to break the strong encryption used.

An alternative method is to separate the message into individual bits, with a provided key that would add an additional 8 bits to each bit (in order to determine message position) and send each bit as a separate transmission. This is too time consuming to be practical in today's computing environment but may be possible in the near future. The preferred embodiment at the present time is to use byte-based transmissions with strong encryption.

If a file has been stored with multiple parts, encrypted and stored in multiple locations, the User can allow another user to access the file in a number of ways. For example, in response to hitting a "send" option on the User's GUI, a dialog could open asking who (on the trusted user list) the User wants to send it the file to. Each trusted user is configured with an identity in the file transmission structure. The User selects the trusted user he wishes to send the file to and if the file was stored locally, the system would perform the encryption and splitting routines, and send the pieces to the other user. But if the file is already stored in multiple different places as in the case of this example, the system would:
1. send a notification to the other user that the first user is sending a file;
2. wait for an acceptance response from the second user;
3. instruct the locations storing those pieces, to send them to the other user;
4. the pieces are then sent to the other user who receives and decrypts them.
This assumes that either the original encryption had been done using a key the second user has access to, or if the second user does not have access to the key, the first user would encrypt, split and then transmit the key.

Of course, access to such stored documents could be delegated or emailed to any other party, who does not necessarily have to be on a "trusted user list".

FIGS. 4A-4D

FIGS. 4A-4D present a process flow diagram of an authentication model in an embodiment of the invention.

FIG. 4A presents a process flow diagram of the authentication process from the point of view of the Client.

Typically, values for the User Name 70 and Passphrase 72 are entered interactively by the User. It is not generally desirable for the User's computer to store the last User Name 70 and/or Passphrase 72 as some systems do, as it compromises security.

The User Name 70 and Passphrase 72 are then encrypted 76 on the client using a seed number. This seed number 74 will be generated in some manner of generating random or pseudo-random numbers as known in the art, such as:
  using a random number generating algorithm;
  accessing various time signals;
  accessing random data locations in memory; or
  tracking the User's random cursor movements.

The encrypted username 78 and encrypted passphrase 80 are then combined into one large number 82 which is then separated into multiple parts using some manner of partitioning algorithm 84. The separated values are stored in an array structure 86. The contents of the separate elements of the array 86 are then sent to separate external servers 88 for comparison with a data set stored on the Protected Server.

Figure 4B:
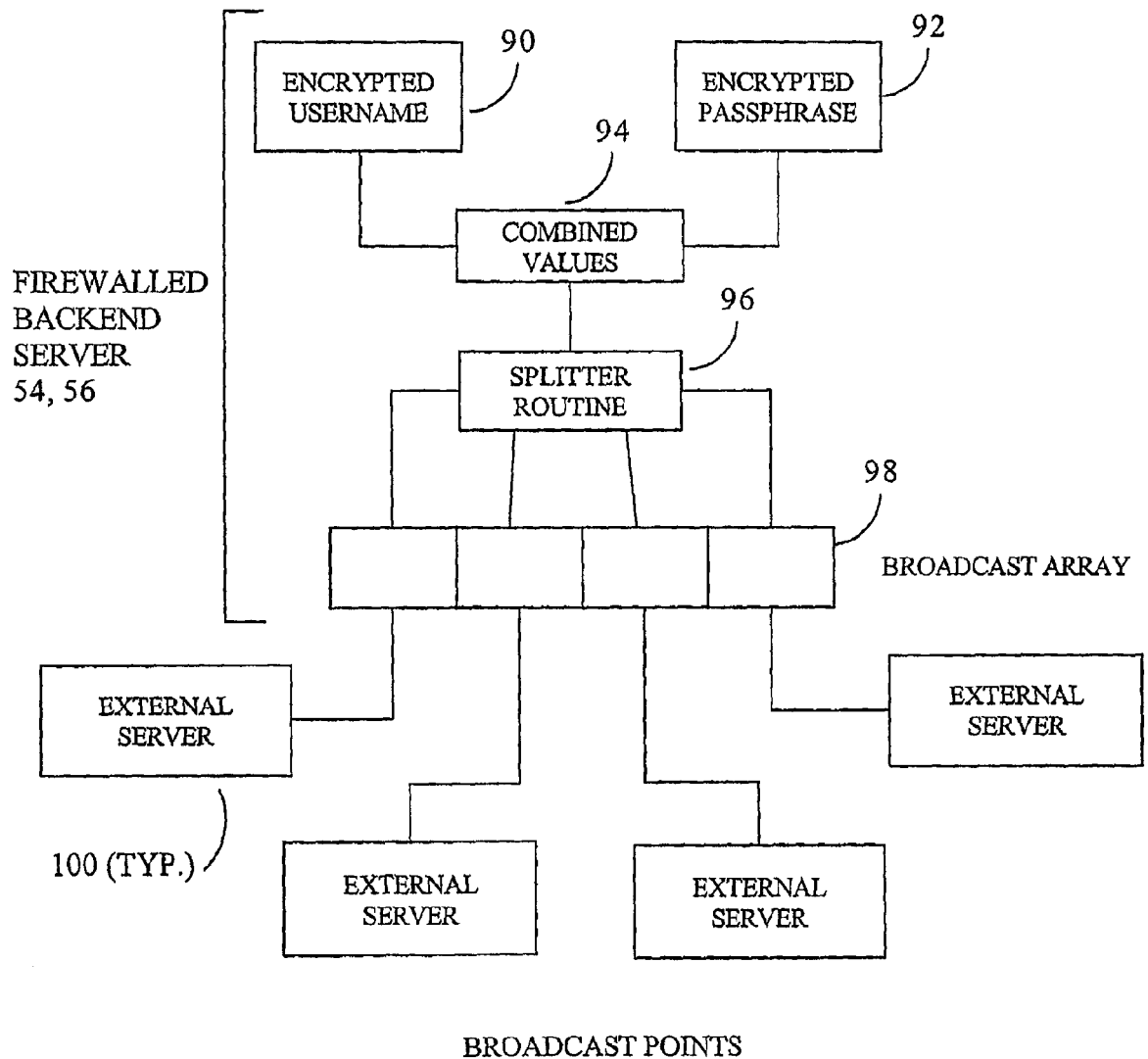

FIG. 4B presents a process flow diagram of the authentication process from the point of view of Firewalled Backend Server.

An encrypted User name 90 and encrypted passphrase 92 are stored in the database records of the Firewalled Backend server 54, 56. In the event of a client submitting an authentication request, the external servers 100 request the stored encrypted User name 90 and encrypted passphrase 92 from the Firewalled Backend server 54, 56. These encrypted User name 90 and passphrase values 92 are then combined into one large number 94 which is then separated into multiple parts via the splitting subroutine 96. Separated values are stored in an array structure 98. The contents of each element of the array structure 98 are sent to separate external servers 100 for comparison with client data broadcast.

Figure 4C:
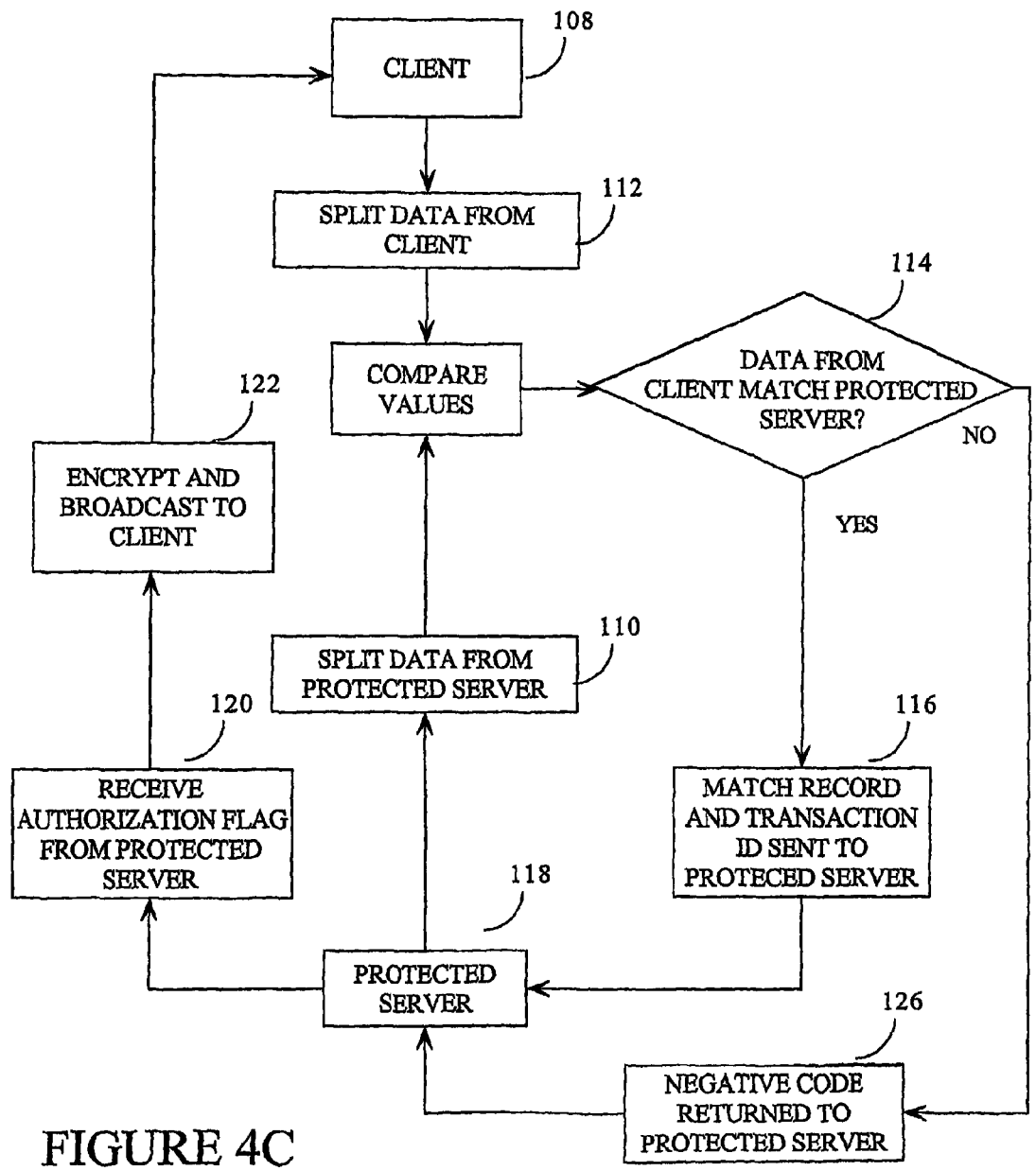

FIG. 4C presents a process flow diagram of the process of Final Authentication on the gateway servers.

Each gateway server 52 receives matched data sets from both the client 108 and the protected server 118 (recall that the protected server 118 is the server that contains the secure data and/or resources). Each data set is a piece of the aggregate value of both the encrypted ID and the encrypted Passphrase. The partial data set 110 from the protected server 118 and the partial client data set 112 are compared 124 at the gateway server 52. If the two data sets match 114, a positive validation code 116 is generated with a transaction identification number and is then returned to protected server 118.

The protected server 118 then returns an authentication code to each of the gateway servers 52, which they receive at block 120. This authentication code is split into encrypted parts 110 by the protected server 118 before returning to external servers 52. The external servers 52 encrypt and broadcast their respective portions of the authorization code, returning them to the client 108 at block 122. When the partial authorization codes are received by the client 108, they are then recombined into a single authentication number. This authentication number would be appended specifically for any transactions within this session. Any use of this authentication number beyond this session would be considered invalid.

If data sets within each or any external server do not match, a negative code is returned to protected server at block 126 and the authentication code is deemed invalid. If each data set matches within each external server, positive codes are returned to the protected server, and the combined authentication code is deemed valid.

Figure 4D:
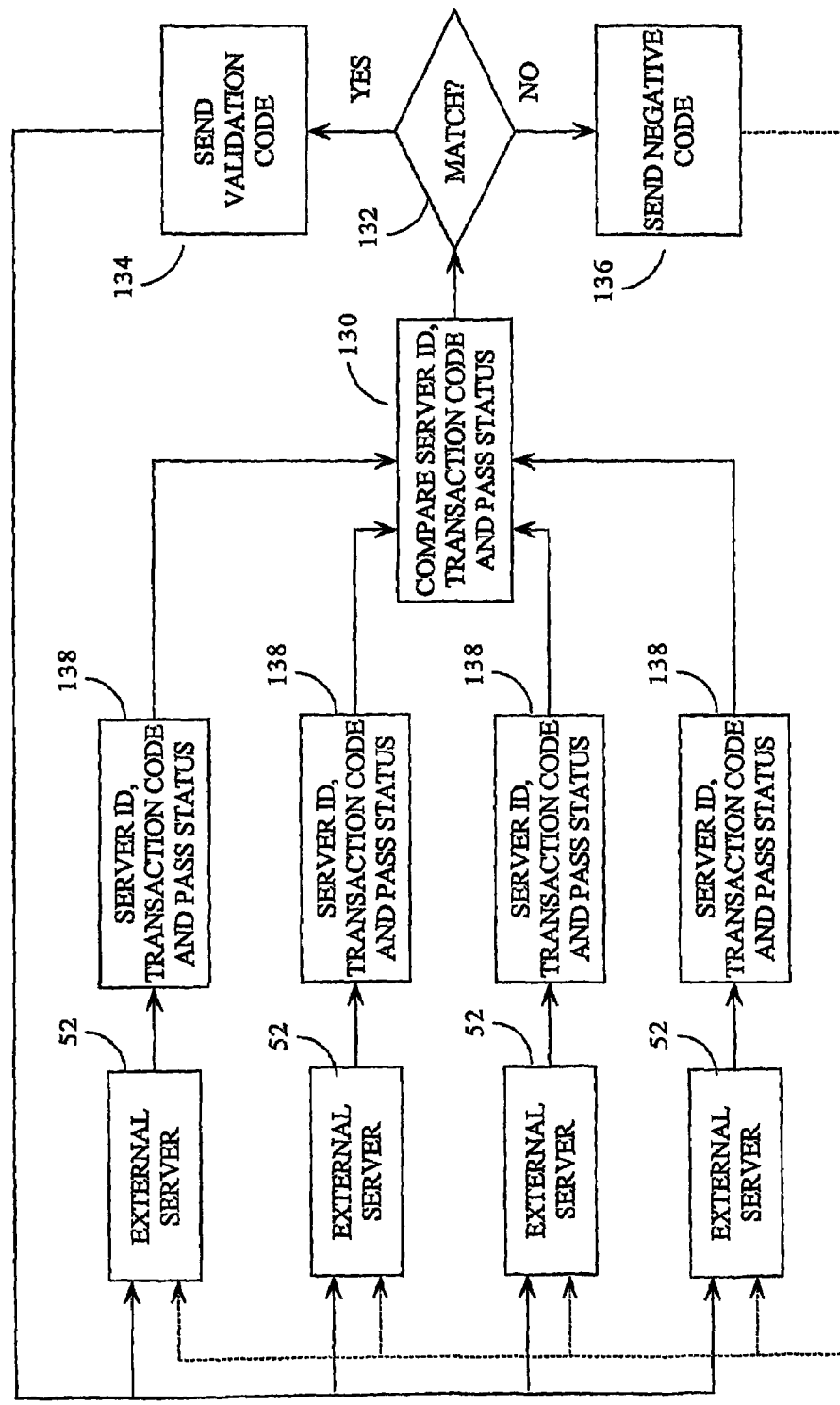

FIG. 4D illustrates a simplified overview of the entire Authentication Process.

First, the Client combines and broadcasts an encrypted data set (User ID and passphrase). The encrypted data set is combined into an aggregate value and then split, after which it is broadcast to external servers 52 (one data set per server).

When this data is received by the external servers 52, the external servers 52 request relevant data from the protected server 54. Each external data set 138 (typ.) is compared 130 with the generated data set from the protected server 54. The validation state is sent to the protected server 54, and the Protected server 54 compares all validation states in the transaction.

In the event of positive verification of every partial data set at step 132, the protected server 54 returns an (encrypted, partial) authentication code. Authentication codes are sent to the client and recombined. If this authentication code is recombined into a valid number, transaction proceeds (step 134). If the authorization code is recombined into an invalid number, transaction halts (step 136).

EXAMPLE

Application to an Authorization Process in an Online Music Store Card

A User accesses an online music store to make a purchase. After selecting "checkout" in his online shopping cart, the User is prompted for a User name, password and card number (the User's music card was obtained via mail or at physical location. The User could also use credit or debit card for the transaction). The User then enters his User name, password and card number. The User name and password are encrypted using his card number as a seed value (further modified by the use of a time stamp), using, for example, public key based encryption such as PGP. The encrypted User name and password are joined into a single value, then split into byte-sized chunks. The algorithm used to do this is based on byte-generation via alternating bits, starting at each end of full value, the first bit being taken from the beginning of the string, the second bit is the last bit in the string, the third bit is the second in the string, the fourth bit is the second from last in the string and so on for each byte.

This example provides a highly secure transaction. In practice, however, less secure methodologies may be employed, such as simple byte for byte chunking. In such a case each chunk is submitted to a separate, music store, external server. Each chunk is algorithmically compared to stored values from the music store's protected server. If they match internal values, a pass code is sent to the protected server. If all values pass, the transaction is completed and an authorization stamp is encrypted, broken apart into byte-sized chunks and sent to the online music store's separate, external servers. Each piece of the transaction code is then sent to the User and reassembled within the User's software. If all of the chunks match, the User is given a transaction succeeded message and, if applicable, download of music begins.

Thus, multiple data streams are generated for a single transaction with the added advantage of allowing some overlap in streams for enhanced error correction for cases of unencrypted data transmission. This provides a greater degree of security for any network transmission.

Thus, in short:
A process has been developed that enhances the level of electronic encryption and authorization;
This process divides electronic messages into multiple parts and then authenticates each individual part before recombining into a coherent whole;
With encryption, exponentially higher levels of security for both data transmission and authentication, are provided;
Messages are algorithmically separated into parts. Each part may be transmitted to different servers;
Where each part is then authenticated;
Parts are transmitted to a firewalled server;
Parts are re-combined (or in case of authentication, individual authentication certificates are compared);
In case of authentication, certificates are returned to each authenticating server. For encryption, parts are broken apart again and returned; and
Validity certificates are returned to originating computer.

Options and Alternatives

While particular embodiments of the present invention have been shown and described, it is clear that changes and modifications may be made to such embodiments without departing from the true scope and spirit of the invention. For example:

1. the invention could be used for encrypted file transmission such as: high security documents, digital media files (such as movies or music), financial transaction data, authentication codes, any document needing absolute verifiable sources, live video transmission (e.g. corporate digital conferences, CCTV, or subscription or fee based broadcast), electronic voting, RFID tags or transmission of biometric authentication date;
2. unencrypted file transmission with enhanced error correction;
3. automatic protection against server level viruses. This works via checksum matching;
4. use of multiple routing in protected server to counter DOS attacks;
5. network authentication for financial transactions, network logons or similar processes;
6. wireless Data Transmission including: Modified WEP encryption, and Multiple broadcast point transmission;
7. secure networked storage and retrieval of data;
8. use of splitting via multiple processors in addition to multiple servers. The difference is that splitting via multiple processors applies to a single computer rather than network (at present such applications are technically impractical);
9. Multiple Server File Storage; it would also be possible to take a single file and spread it byte or bit wise over multiple hard drives residing in multiple computer systems;
10. Multiple encryption; an alternative would be to split the message before encryption and then encrypt using multiple schemas for a single message or string;
11. This technology could also be used to split a single value into multiple locations on a single machine (e.g. multiple tables within a single database); or 12. This technology could be used to protect communications between multiple computers, servers and/or networks in a symmetric multi-processing, grid-computing or cluster-computing model along the lines of Chaos Linux or the SETI project.

CONCLUSIONS

The present invention has been described with regard to one or more embodiments. However, it will be apparent to persons skilled in the art that variations and modifications can be made without departing from the true scope and spirit of the invention.

The method steps of the invention may be embodiment in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory medium such computer diskettes, CD-Roms, Random Access Memory (RAM), Read Only Memory (ROM) or similar computer software storage media known in the art, may be programmed to execute such method steps. As well, electronic signals representing these method steps may also be transmitted via a communication network.

The system and method described could, for example, be applied to computers, smart terminals, personal digital assistants and Internet-ready telephones. Again, such implementations would be clear to one skilled in the art, and do not take away from the invention.

All citations are hereby incorporated by reference.

What is claimed is:

1. A method of secured communication over a networked system comprising:
a first party:
splitting, using at least one processor, a secure data message into two or more separate messages, said secure data message including a request for access to data held by a second party and said secure data message including an encrypted message, each separate message encrypted with a different key and including at least some unique portion of said secure data message, said two or more separate messages collectively preserving information contained in said secure data message; and
transmitting each of said two or more separate messages to a separate gatekeeper;
each of said separate gatekeepers:
receiving a respective one of said separate messages;
receiving a partial data set from said second party;
securely processing the one of said separate messages by comparing the one of said separate messages to the partial data set, securely processing the one of said separate messages including separately protecting and storing the one of said separate messages;
generating a pass code responsive to comparing the one of said separate messages to the partial data set; and
transmitting the one of said separate messages and the pass code to the second party;
said second party:
receiving the one of said separate messages and the pass code from each of said separate gatekeepers;
generating an authentication code;
splitting up said authentication code into two or more parts;
separately encrypting said two or more parts;
transmitting said two or more parts to separate gateways configured to forward the encrypted parts to a user so that they are re-assembled and decrypted; and
re-assembling each of the one of said separate messages.

2. The method of claim 1 wherein said secure data message is split using a partitioning algorithm.

3. The method of claim 2 wherein said partitioning algorithm comprises a sliding algorithm.

4. The method of claim 2 wherein said partitioning algorithm comprises a non-sliding algorithm.

5. The method of claim 2 wherein the contents of said two or more separate messages overlap.

6. The method of claim 2 wherein the contents of said two or more separate messages do not overlap.

7. The method of claim 1 wherein said request for access to data includes data selected from a group consisting of a Username, a password, a passphrase and a User identifier.

8. The method of claim 1 wherein said second party includes an authentication server.

9. The method of claim 1 wherein said first party is selected from a group consisting of:
a personal computer;
a cellular telephone;
a personal digital assistant (PDA);
a portable music player;
a wireless email device;
a portable video player; and
other electronic communication device.

10. The method of claim 1 wherein said encrypted message comprises an encrypted text message.

11. The method of claim 1 wherein said secure data message comprises an email message.

12. The method of claim 1 wherein said transmitted separate messages further comprise decoy messages.

13. The method of claim 1 wherein said second party comprises a secure server.

14. The method of claim 1 wherein said second party comprises a firewalled server which will only communicate with said separate gatekeepers.

15. The method of claim 1 wherein said secure data message is of a type selected from a group consisting of:
high security documents;
digital media files, including movies and music files;
financial transaction data;
authentication codes;
any document requiring absolute verifiable sources;
live video transmissions, including corporate digital conferences, Closed Circuit Television (CCTV), or subscription and fee based broadcasts;
electronic voting;
Radio Frequency Identification (RFID) tags; and
transmission of biometric authentication date.

16. The method of claim 1 wherein said secured communication is applied to a system selected from a group consisting of:
unencrypted file transmission with enhanced error correction;
automatic protection against server level viruses via checksum matching;
use of multiple routing in protected server to counter denial-of-service (DOS) attacks;

network authentication for Financial transactions or Network logons;
wireless Data Transmission for Modified Wired Equivalent Privacy (WEP) encryption or Multiple broadcast point transmission;
secure networked storage and retrieval of data;
use of splitting via multiple processors in addition to multiple servers; and
splitting via multiple processors applied to a single computer rather than a network of computers or servers.

17. The method of claim 1 wherein said secure data message is securely stored at said first party, said first party including a storage server, and said second party including a user computer device retrieving from the storage server said secure data message.

18. A method of authentication comprising:
generating identification data for a user;
dividing, using at least one processor, said identification data into two or more separate sets, each of the separate sets encrypted with a different key and including at least some unique portion of the identification data, the separate sets collectively including information contained in said identification data;
protecting each of said two or more separate sets; and
transmitting each of said two or more separate protected sets of data to two or more intermediate servers;
said two or more intermediate servers:
receiving a partial set of data from an authentication server;
comparing the two or more separate protected sets of data to the partial set of data and storing the two or more separate protected sets of data;
generating a pass code responsive to comparing the two or more separate protected sets of data to the partial set of data; and
forwarding said two or more separate protected sets of data and the pass code to the authentication server;
said authentication server:
generating an authentication code;
splitting up said authentication code into two or more parts;
separately encrypting said two or more parts;
transmitting said two or more parts to separate gateways configured to forward the encrypted parts to a user for reassembly and decryption; and
re-assembling the two or more separate protected sets of data and determining whether access should be granted to said user.

19. A system for secured communication comprising:
a first computer device operable to:
split a secure data message into two or more separate messages, said secure data message including a request for access to data of a second device and said secure data message including an encrypted message, each separate message encrypted with a different key and including at least some unique portion of said secure data message, and said two or more separate messages collectively preserving information contained in said secure data message; and
transmit each of said two or more separate messages to a separate gatekeeper;
each of said separate gatekeepers having a processor operable to:
receive a respective one of said separate messages;
receive a partial data set from the second device;
securely process the one of said separate messages by comparing the one of said separate messages to the partial data set and by separately protecting and storing the one of said separate messages;
generate a pass code responsive to the comparison of the one of said separate messages to the partial data set; and
transmit the one of said separate messages and the pass code to the second device;
said second computer device being operable to:
receive the one of said separate messages and the pass code from each of said separate gatekeepers;
generate an authentication code;
split up said authentication code into two or more parts;
separately encrypt said two or more parts;
transmit said two or more parts to separate gateways configured to forward the encrypted parts to a user so that they are re-assembled and decrypted;
re-assemble each of the one of said separate messages;
said first device, second device and separate gatekeepers interconnected via a communication network.

* * * * *